United States Patent
Daugherty

[15] 3,665,987
[45] May 30, 1972

[54] SHUFFLE FEED POSITIONER

[72] Inventor: Ralph K. Daugherty, San Jose, Calif.

[73] Assignees: Genevieve I. Hanscom; Genevieve I. Hanscom, Robert Magnuson, Lois J. Thomson, as Trustees of the Estate of Roy M. Magnuson, ; part interest to each

[22] Filed: Sept. 2, 1970

[21] Appl. No.: 68,926

Related U.S. Application Data

[62] Division of Ser. No. 736,861, June 13, 1968, Pat. No. 3,584,735.

[52] U.S. Cl. ............................................146/81 R, 198/218
[51] Int. Cl. ..........................................................A23n 15/04
[58] Field of Search ..................146/81 R, 84, 81 A; 198/218

[56] References Cited

UNITED STATES PATENTS 3,291,173    12/1966    Smith et al. ..........................146/81 R Primary Examiner—Willie G. Abercrombie
Attorney—Allen and Chromy

[57] ABSTRACT

A shuffle feed structure for feeding articles which require trimming of the ends, in which the article advancing faces of the shuffle members include a series of wedge-shaped surfaces for feeding and orienting the articles (such as pickles) so that each article rests against one of the inclined faces of the shuffle feed member and abuts the end face of one of the wedges. During the last step of movement of the shuffle feed the articles are carried through a pair of trimming knives which cut off the ends of the pickle so that the middle segment of each pickle is cut to a uniform length.

3 Claims, 10 Drawing Figures

Patented May 30, 1972

INVENTOR.
RALPH K. DAUGHERTY
BY
*Ollen and Sherry*
ATTORNEYS

INVENTOR.
RALPH K. DAUGHERTY
BY
ATTORNEYS

Patented May 30, 1972 3,665,987
3 Sheets-Sheet 3
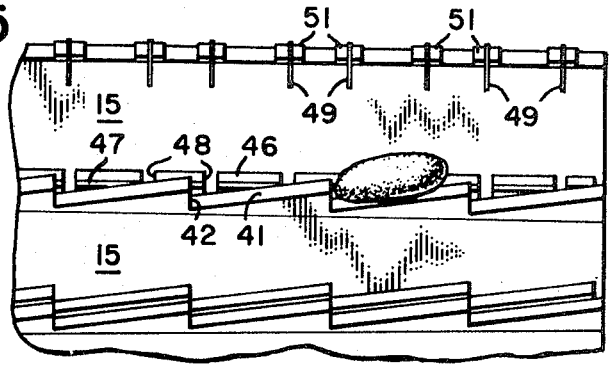
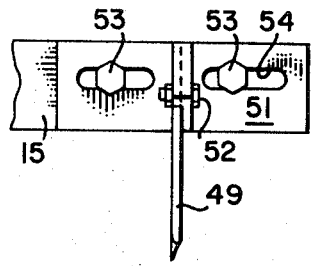
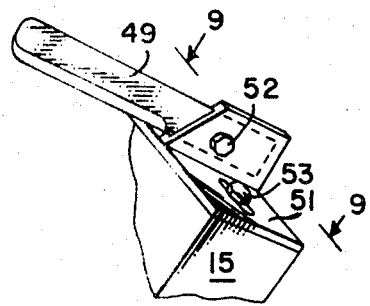
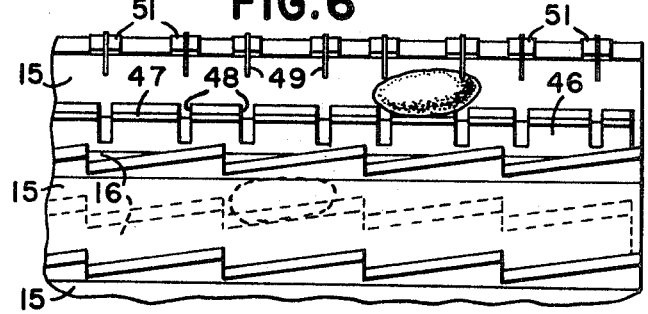
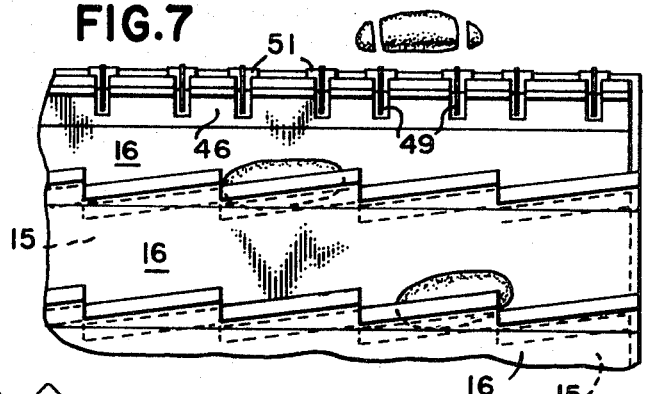
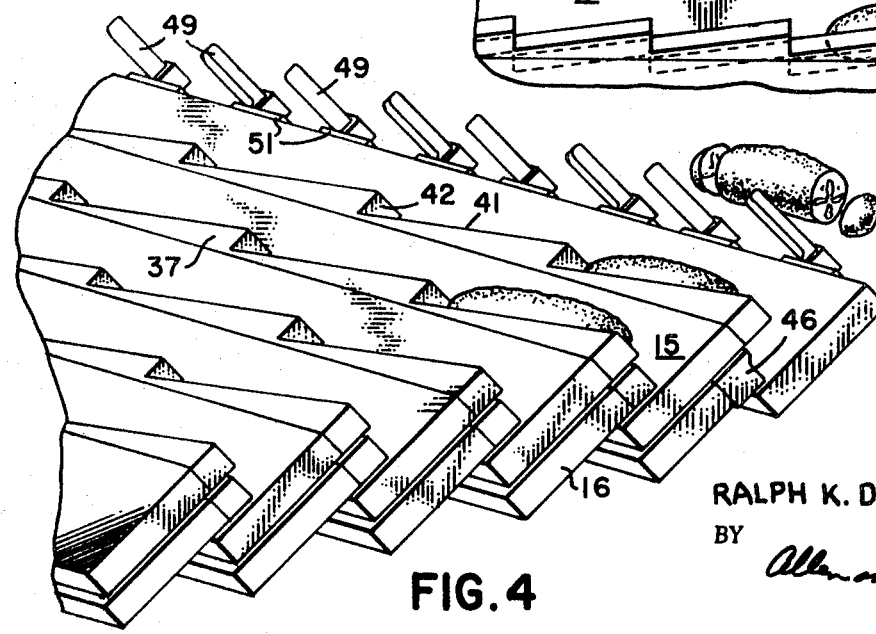
INVENTOR.
RALPH K. DAUGHERTY
BY
ATTORNEYS

3,665,987

SHUFFLE FEED POSITIONER

DESCRIPTION OF THE INVENTION

This application is a division of my copending application Ser. No. 736,861, filed June 13, 1968, now U.S. Pat. No. 3,584,735, entitled Shuffle Feed Positioner.

In the handling of elongated articles such as pickles where the articles are being subsequently cut into longitudinal segments for packing, it is desirable to orient the pickles and to present them to knives which will cut off the end portions of each pickle to provide intermediate segments of a given length for subsequent processing, and the present invention has to do with an efficient feeding mechanism of simple structure which will align the pickles properly and present them to the knives as described above.

It is a general object of the invention, therefore, to provide a shuffle feed mechanism having article advancing faces of wedge-shaped design which will act to orient the articles in a desirable fashion for trimming of the ends thereof.

It is another object of the invention to provide a pickle end trimmer including a shuffle feed mechanism in which the pushing faces of the shuffle members are formed transversely as a series of inclined wedges so as to definitely orient each pickle in a particular pickle path for subsequent processing.

Other objects and advantages of the invention will be apparent from the following description of certain preferred embodiments thereof, as illustrated in the accompanying drawings, in which:

FIG. 4 is a perspective schematic view of a shuffle feed mechanism showing the mechanism at the instant of discharge of a pickle which has had its ends cut;

FIG. 5 is a schematic view illustrating the operation of the mechanism in positioning a pickle on the shuffle members;

FIG. 6 is a view similar to FIG. 5 showing another stage in the positioning of the pickles on the flights of the shuffle feed mechanism;

FIG. 7 is a schematic view showing the pickles properly positioned on a shuffle feed flight ready for presentation of the cutting knives as illustrated in FIG. 4;

FIG. 8 is a perspective view of one of the knives;

FIG. 9 is a detail view of the knife shown in FIG. 8, being taken as indicated by the line 9—9 in FIG. 8.

Figure 1:
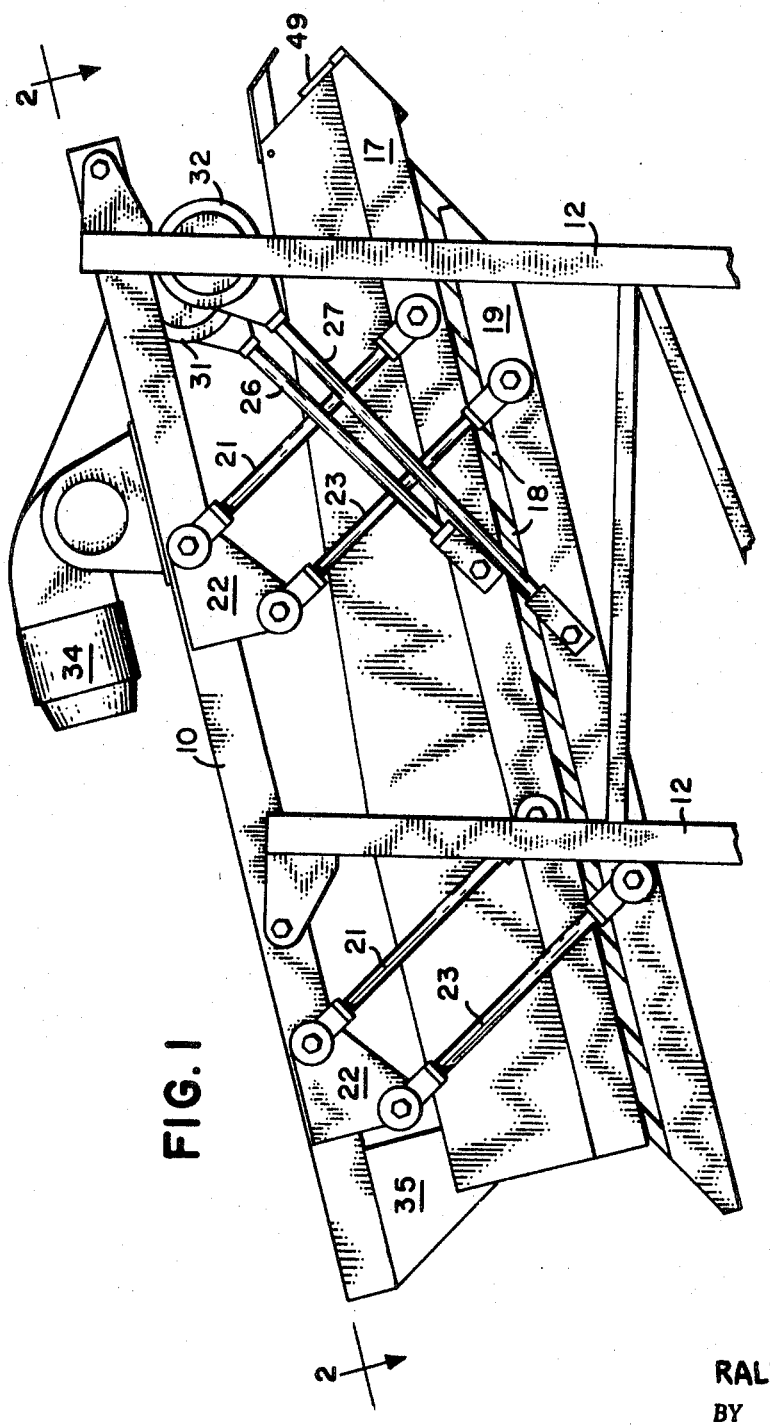
FIG. 1 is a side elevational view of a shuffle feed mechanism embodying the instant invention.
Figure 2:
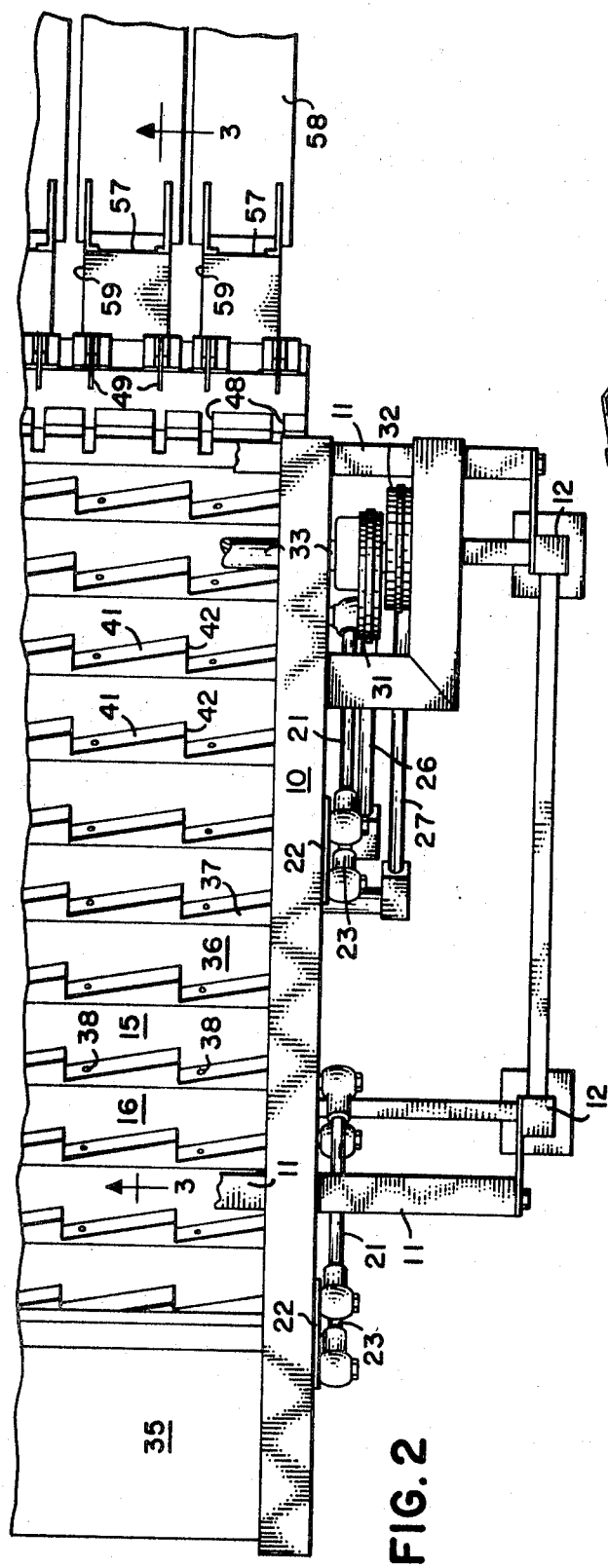
FIG. 2 is a fragmentary plan view taken in a plane indicated by the line 2—2 in FIG. 1 of the shuffle feed mechanism.

Referring to FIGS. 1 and 2, the shuffle feed structure includes an overhead frame which includes respective side frame members 10 and a plurality of cross members 11 supported on frame posts 12.

The shuffle feeding mechanism comprises two similar movable sets of alternating shuffle members 15 and 16 (FIGS. 2 and 3) which are mounted in inclined position and have a long upwardly facing article supporting portion and a short upwardly facing article advancing and supporting portion. The set of shuffle feed members 15 extends between and is secured to opposite frame members 17, and the set of shuffle members 16 is secured on upwardly projecting angles or members 18 from opposite frame members 19. The frame members 17 (FIGS. 1 and 2) are supported by four upwardly extending pivoted links 21, one pair on each side, which are each secured to a plate 22 on the frame members 10, and the frame members 19 and their corresponding shuffle members 16 are supported by respective parallel links 23 which are similarly connected in a pivoted fashion to the plates 22. It will be understood that in the usual fashion the shuffle members 15 and 16 of the respective sets of shuffle members are disposed alternately in the series of shuffle members shown, and as one set of shuffle members advances in feeding movement, the other shuffle member is being retracted.

The reciprocating drive for the respective shuffle feed members is obtained by drive links 26 and 27 (FIGS. 1 and 2), there being one pair on each side, the drive links 26 being pivotally connected to respective frames 17 and 19 at their lower ends and at the upper end to respective eccentric straps 31 and 32 on a shaft 33 which is suitably driven from a motor 34. The articles to be fed to the shuffle feed members, such as pickles, are conveyed thereto by a feed chute 35 of conventional construction.

This type of shuffle feed mechanism is disclosed in the U.S. Pat. to Magnuson No. 2,792,92 issued May 21, 1957. It will be understood, however, that the invention is equally applicable to a shuffle feed in which one set of shuffle feed members is stationary and the other set reciprocates with respect thereto.

Referring to FIG. 2, it will be seen that each shuffle member comprises a base part 36 and a pocket part 37. The pocket part provides the advancing face of the shuffle member and is secured to the base part 36 by screws 38. This structure enables easy replacement of the active parts of the shuffle members or flights, whether for reasons of change of article or size in the article being handled, or whether because of wear or accidental breakage.

Figure 3:
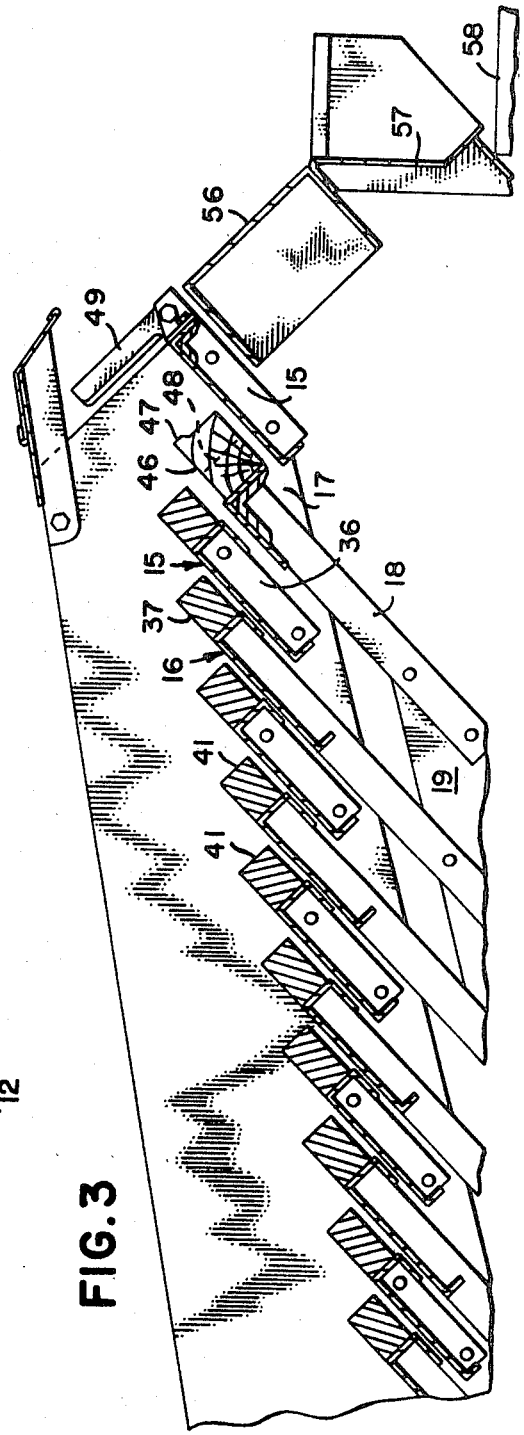
FIG. 3 is a longitudinal sectional view of the mechanism taken in the plane indicated by the line 3—3 in FIG. 2.

Referring to FIGS. 2, 3 and 4, the pocket part 37 of the advancing face of each positioning shuffle feed member is composed of a series of wedge members comprising a front slanted advancing or camming face 41 and each of these advancing faces terminate at their upper or leading edge at a perpendicular stop face or abutment 42.

Referring to FIG. 3, it will be seen that the endmost shuffle member supported by the frame 19 and one set of movable shuffle members is of special construction and comprises a wooden block 46 having a projection or lip 47 at the top of the plane-like advancing face thereof for overlying a pickle and tending to retain the pickle against the adjacent shuffle member 15. Also, this shuffle member 46 is provided with a series of slots 48 which cooperate with a series of knives 49 carried by the endmost shuffle member 15 so that as the two shuffle members approach each other, the knives will cut through a pickle or other article carried forward by the shuffle member 46 and will enter the slots 48. The slots 48 and the knives 49 are provided in related position to each of the article advancing faces 41 to straddle such faces and to cut off the ends of a pickle which has been aligned by one of the faces 41.

Referring to FIGS. 8 and 9, each cutting knife 49 is detachably mounted in a T-shaped supporting bracket 51 by means of a screw 52, and the base of the T-member 51 is secured to the shuffle member 15 by screws 53 engaging slotted holes 54 in the bracket 51 so that the proper lateral position of each knife can be adjusted to match the lengths of different sized feeding wedges.

After a pickle is carried through the knives 49 it is discharged over a ramp 56 (FIGS. 2 and 3) and down through a hopper portion 57 and into a suitable receptacle 58, the ramp 56 having openings 59 therein (FIG. 2) whereby the cut end portions can fall down at this point and not be fed with the segments through the chute 57 and into receptacle 58.

Figure 10:
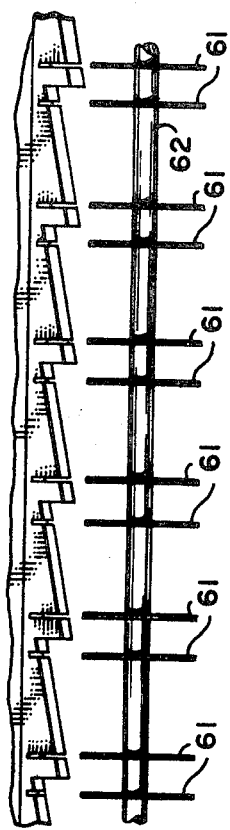
FIG. 10 is a view of the modified form of the invention wherein rotary knives are employed in lieu of the stationary knives shown in the preceding modification.

Referring to FIG. 10, the cutoff means is shown schematically as a series of rotary knives 61 carried by a shaft 62 suitably journaled in fixed position on the frame and driven in a conventional manner. The knives 61 are spaced similarly to the knives 49 and operate in a similar manner.

While I have shown and described certain preferred embodiments of the invention, it will be understood that the invention is capable of variation and modification from the forms shown so that the scope thereof should be limited only by the proper scope of the claims appended hereto.

I claim:

1. In a shuffle feed mechanism for orienting elongated food articles such as pickles, a frame, a first set of transversely extending shuffle members, a second set of transversely extending shuffle members arranged in alternating relation with the shuffle members of said first set, each of said shuffle members including an upper article supporting surface and a front article advancing surface, means mounting said sets on said frame for relative reciprocating movement in a direction to advance an article from shuffle member to shuffle member, the article advancing face of certain of said shuffle members comprising a transverse series of wedges providing a saw tooth construction and including a transverse series of article stops to which a corresponding series of camming surfaces lead, whereby articles fed over the shuffle feed eventually become positioned with an end against a stop, and a series of pairs of knives positioned at the discharge end of the mechanism, with each pair of knives straddling a stop.

2. In a shuffle feed mechanism for orienting elongated food articles such as pickles, as recited in claim 1, in which the final shuffle member of a series has a transversely straight article advancing face and is slotted to receive said knives.

3. In a shuffle feed mechanism for orienting elongated food articles such as pickles, as recited in claim 2, in which said final shuffle member has a projecting ledge at the top of its advancing face to restrain upward movement of an article engaged thereby.

* * * * *